United States Patent [19]
Brauer et al.

[11] Patent Number: 6,007,250
[45] Date of Patent: Dec. 28, 1999

[54] HOUSED BEARING WITH INTEGRAL SENSOR

[75] Inventors: Michael C. Brauer, Goshen; John C Hanson, West Hartford; Mark LaCroix, New Hartford; A. John Santos, Farmington, all of Conn.

[73] Assignee: The Torrington Company, Torrington, Conn.

[21] Appl. No.: 09/158,957

[22] Filed: Sep. 22, 1998

Related U.S. Application Data

[60] Provisional application No. 60/063,466, Oct. 10, 1997.

[51] Int. Cl.$^6$ .............................. F16C 19/08; G01P 3/44
[52] U.S. Cl. ..................... 384/448; 324/173; 324/207.25
[58] Field of Search ................................. 384/448, 477; 324/173, 174, 207.25

[56] References Cited

U.S. PATENT DOCUMENTS

| | | |
|---|---|---|
| 5,433,525 | 7/1995 | El-Ibiary .............................. 374/448 X |
| 5,439,296 | 8/1995 | El-Ibiary .................................. 384/448 |
| 5,594,334 | 1/1997 | Sonnerat et al. ......................... 324/173 |
| 5,628,570 | 5/1997 | Sahashi et al. .......................... 384/448 |
| 5,663,640 | 9/1997 | Sakamoto ............................ 384/448 X |
| 5,677,624 | 10/1997 | Miyazaki et al. ........................ 324/173 |
| 5,744,720 | 4/1998 | Ouchi ................................... 384/448 X |

*Primary Examiner*—Thomas R. Hannon
*Attorney, Agent, or Firm*—John C. Bigler

[57] ABSTRACT

An outer ring has a spherically convex outer surface mounted within a bore of a housing such that the outer ring may be misaligned with respect to the axis of the bore. A sensor target is mounted on an inner ring that is rotatable with respect to the outer ring, and a seal is mounted on the outer ring. A sensor is mounted on the seal in proximity to the sensor target, and a flexible electrical conductor is connected to the sensor for transmitting signals from the sensor. A portion of the flexible electrical conductor is fixed with respect to the housing. Circuitry may be electrically connected to the flexible electrical conductor. The flexible conductor and circuitry may be provided by a flexible circuit board.

15 Claims, 2 Drawing Sheets

HOUSED BEARING WITH INTEGRAL SENSOR

This application claims benefit of provisional application Ser. No. 60/063,466 filed Oct. 10,1997.

BACKGROUND OF THE INVENTION

This invention relates generally to a self-aligning bearing mounted within a housing and, more particularly, to a housed, self-aligning bearing with an integral sensor for detecting speed or position of a rotating shaft.

Various bearings are available commercially with integral sensors for the purpose of measuring bearing or system parameters such as speed or position of a shaft rotating within the bearing. However, a problem experienced with those designs is lack of protection for the sensor components with respect to vibration, chemical or water contamination, dust or debris, impact, etc. This is especially true when the sensors and related electrical circuitry are miniaturized and are not robust.

Although such bearings with integral sensors work well in many applications, they may be unsuitable in the harsh working environments of applications requiring a rugged, self-aligning bearing. In those applications, the sensor, circuitry components or wiring could be damaged. Those sensor components may also be damaged in less severe applications if the self-aligning bearing is subjected to rough handling, either prior to or during a difficult installation, for example.

The foregoing illustrates limitations known to exist in present devices and methods. Thus, it is apparent that it would be advantageous to provide a more robust housed self-aligning bearing with integral sensor to overcome one or more of the limitations set forth above. Accordingly, a suitable alternative is provided including features more fully disclosed hereinafter.

SUMMARY OF THE INVENTION

In one aspect of the invention, this is accomplished by providing a housed, self-aligning bearing comprising a housing having a bore along an axis, an inner ring, and an outer ring rotatable with respect to the outer ring. The outer ring has a spherically convex outer surface mounted within the bore of the housing such that the outer ring may be misaligned with respect to the axis of the bore. A sensor target is mounted on the inner ring, and a sensor is mounted in proximity to the target on a seal mounted on the outer ring. A flexible electrical conductor is connected to the sensor for transmitting signals from the sensor, a portion of the flexible electrical conductor being fixed with respect to the housing.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
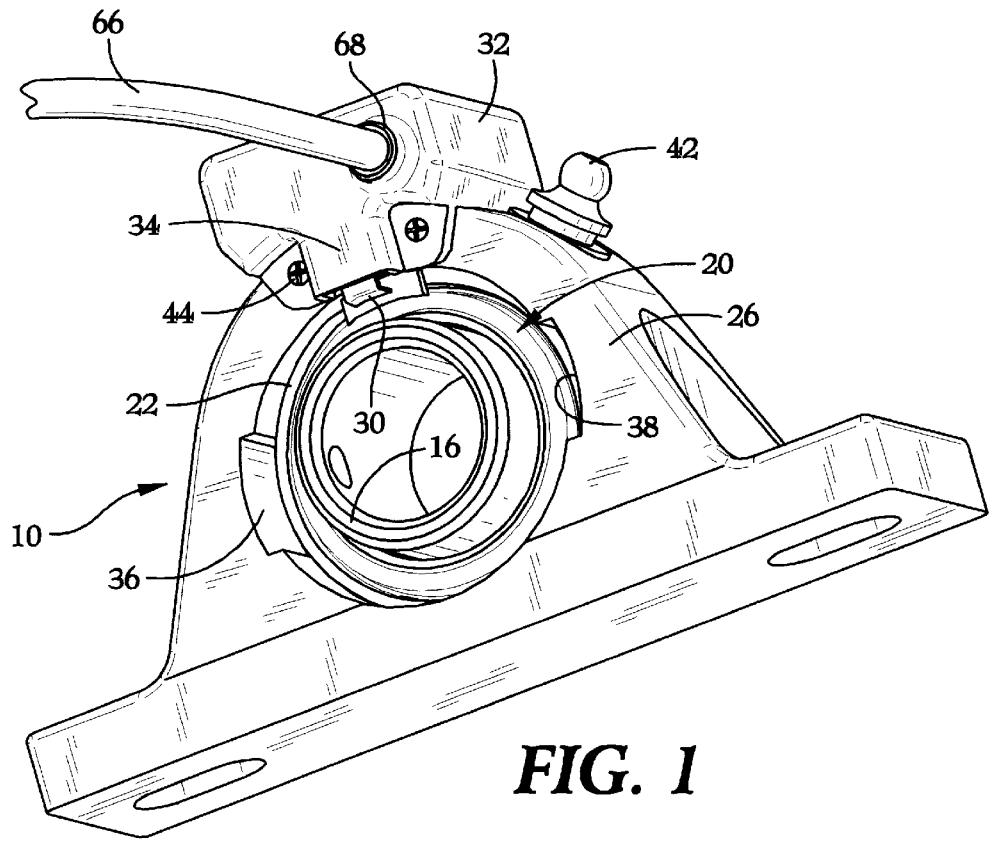
FIG. 1 is a pictorial view of a pillow block type housed, self aligning bearing with integral sensor illustrating the present invention.
Figure 2:
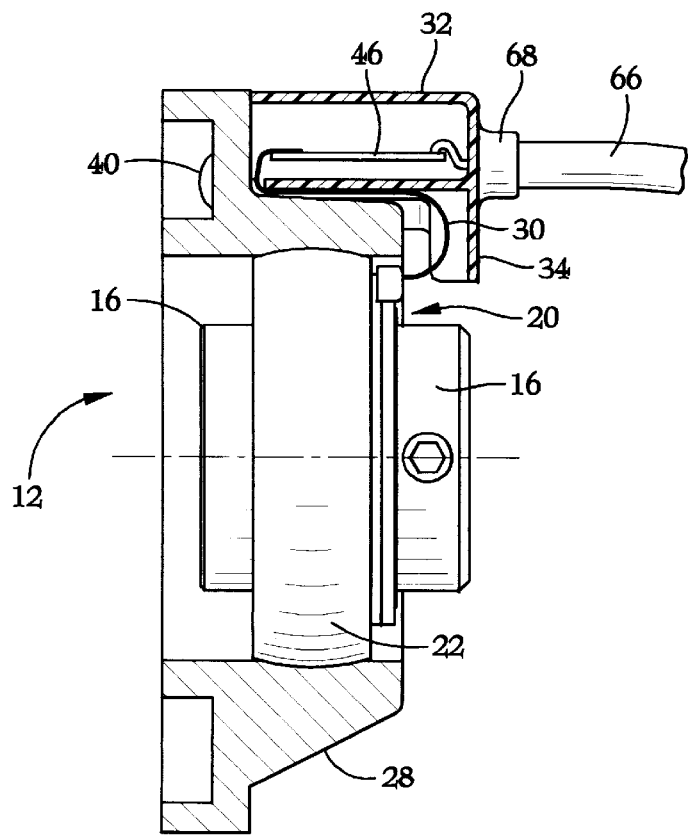
FIG. 2 is a cross sectional view of a flange type housed, self-aligning bearing with integral sensor illustrating the present invention.
Figure 3:
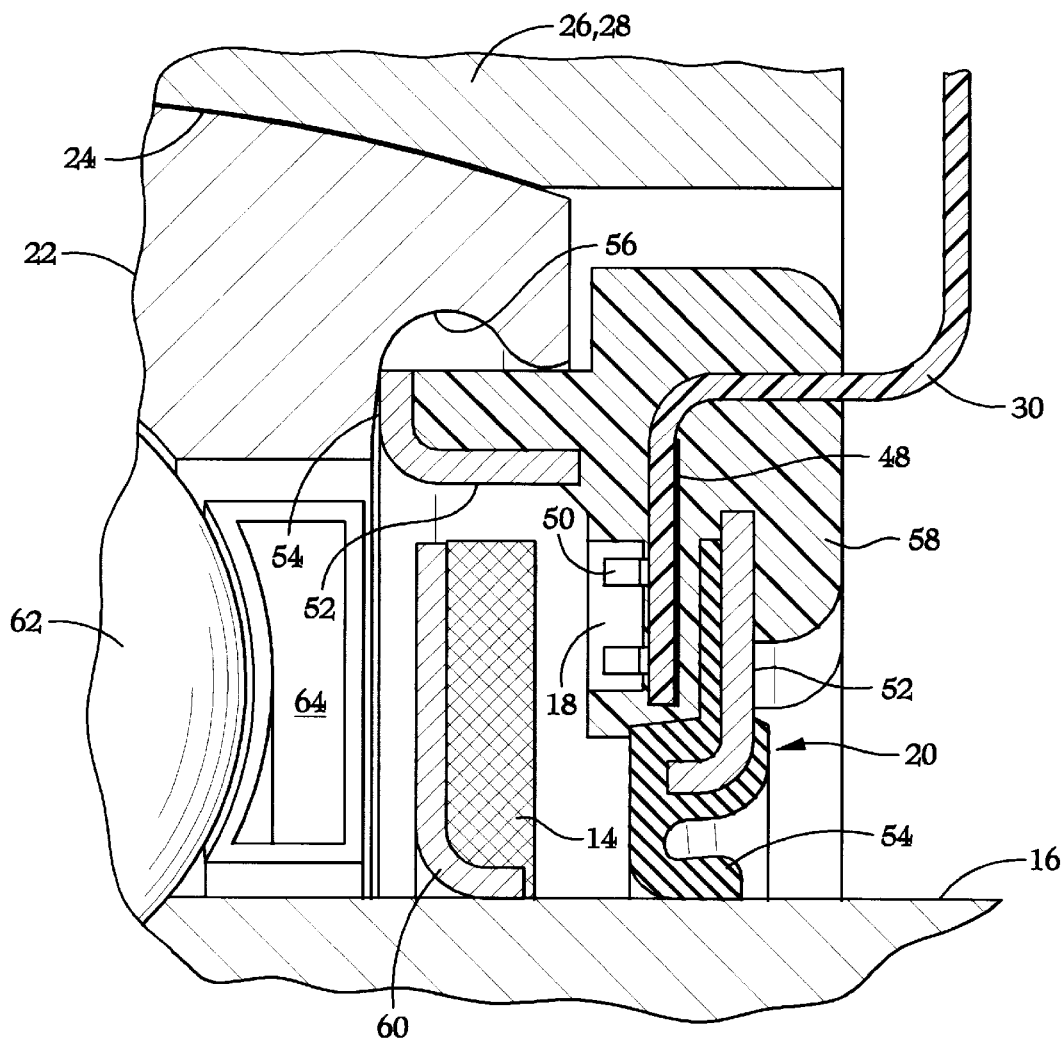
FIG. 3 is an enlarged cross sectional view of a portion of the housed, self-aligning bearing with integral sensor illustrated in FIG. 1 or 2.

Referring now to the drawings, FIGS. 1 through 3 illustrate pillow block and flange type housed, self-aligning bearings 10 and 12, respectively, similar to current housed bearings but incorporating an integral sensor and related components. A sensor target 14 is located inside the bearing (i.e., between the seals) and is fixed to and rotates with a rotatable inner ring 16. A sensor 18 is also located inside the bearing but is fixed to an interior surface of seal 20 (or within seal 20) such that the sensor 18 is in close proximity to the sensor target 14. The seal 20 is fixed to an outer ring 22 having a spherically convex outer surface pivotably mounted within a bore 24 of housing 26 or 28.

As the inner ring 16 rotates with respect to the outer ring 22, the sensor target 14 passes by the sensor 18 and an electrical signal is produced by the sensor 18 corresponding to the position of the sensor target 14. The signal produced by the sensor 18 is transmitted outside the bearing by means of one or more electrical conductors comprising a flexible cable 30. The flexible cable 30 is routed radially away from the centerline of the bearing to a protective box 32. The protective box 32 is small, such that it does not interfere with access to bolts which may be used to mount the pillow block or flange type housed, self-aligning bearings 10 or 12 on equipment.

The protective box 32 includes a "snout" portion 34 that protrudes radially inwardly toward the centerline of the housing bore 24 such that the snout portion 34 covers the electrical conductors of the flexible cable 30. In this way, the electrical conductors are protected from physical impact. If the protective box is made of an electrically conductive material, some measure of protection from electromagnetic interference is provided as well. The snout portion 34 is shaped such that the protective box 32 may be made by molding or casting, as a single piece or as multiple pieces, and such that the snout portion 34 will not interfere with tilting of the inner and outer rings 16 and 22 with respect to the housing 26 or 28.

Preferably, the protective box 32 is shaped such that it does not exceed the footprint area of the flange type housing 28. As a result, the flange type housed, self-aligning bearing may be installed anywhere a traditional flange type housed bearing is mounted. In the case of the pillow block type housed, self-aligning bearing, the small size of the protective box 32 minimizes the encroachment with respect to surrounding equipment. The length of the flexible cable 30 is sufficient such that the protective box 32 can be secured to the housing 26 or 28 after the inner and outer rings 16 and 22 are installed in the housing, and such that the flexible cable 30 will have some measure of strain relief.

The protective box 32 may be mounted in various positions; however, with the pillow block type housing 26, it is preferred that the protective box 32 is located at approximately ninety degrees to the centerline of loading slots 36 and 38 that are used for installing the outer ring 22. This location is preferred in order to reduce the possibility that the flexible cable 30 will be pinched or otherwise damaged during installation, when the inner and outer rings 16 and 22 (with the seal 20 and the flexible cable 30 attached) are introduced into the cavity of the loading slots 36 and 38 with an orientation perpendicular to the plane of the housing 26 and are then rotated to an orientation parallel to the plane of the housing 26. Thus, after the inner and outer rings 16 and 22 are rotated to their final position, the flexible cable 30 will be at the twelve or six o'clock position with the loading slots 36 and 38 being at the three and nine o'clock positions.

In the case of the flange type housing 28, the protective box 32 may be designed to be attached by small screws or fasteners 40 which are inserted through the rear of the housing 28. This construction may reduce tampering with the sensor 18 and related components. In either the pillow block or flange type housed bearings, a grease fitting 42 may be used as a fastener to secure or partially secure the protective box 32 to the housing 26 or 28. In the case of the pillow block type housing 26, the protective box 32 may be mounted from the back, as illustrated with the flanged housing 28, or by small screws 44 threaded into the front of the housing 26 as illustrated in FIG. 1, or by a combination of such fasteners.

To provide a chemical or waterproof construction, the protective box 32 may be filled with a protective material such as epoxy, silicone, or similar material. To ensure that the housed, self-aligning bearing may be steam cleaned and has no cavities that may entrap materials contributing to fungus growth, the protective box 32 may be attached with an adhesive or with a gasket material which will fill any voids between the protective box 32 and mating surfaces of the respective housing 26 or 28. The protective box 32 may also be formed as an integral part of the housing 26 or 28 by molding or casting.

For some applications in which it is desirable to substitute a housed, self-aligning bearing with integral sensor in place of a standard housed, self-aligning bearing without an integral sensor, there may be little additional space for sensor related components. The housed, self-aligning bearing with integral sensor of the present invention can be made using inner and outer rings that are no larger than those of standard housed, self-aligning bearings without sensors. The mounting of the sensor 18 on an inside surface of (or within) the seal 20, with the flexible cable 30 exiting from the seal 20, provides a space efficient package and a robust design with the sensor 18 within the sealed portion of the bearing.

Circuitry for processing electrical signals from the sensor 18 may be provided on a circuit board 46, illustrated in FIG. 2, that may be a conventional circuit board or may be a flexible printed circuit board integrated with a length of flexible circuit board that serves as the flexible cable 30. The flexible circuit board may have one or more layers of circuitry and may be made of a polymer, such as for example Capton, with copper circuit traces. A typical thickness for a flexible circuit board of this type is 0.005 to 0.011 inches.

The sensor 18 may include leaded sensor devices soldered to a small circuit board mounted within the bearing seal 20, with the small printed circuit board then connected to the cable 30 to route the electrical signals from the sensor devices. The sensor 18 may comprise, for example, two Hall-effect devices 50 combined with known electronic circuitry to produce speed, direction and/or position signals.

The integrated construction described above may be used to obtain a thinner profile for the protective box 32 and to allow at least a portion of the processing circuitry to be packaged within the seal 20, integral with the sensor 18. The integrated construction eliminates connections between separate components, providing a further advantage. The flexible circuit board may be held rigidly inside the bearing seal 20 by bonding the flexible circuit board to a rigid surface 48 mounted on the inside of the bearing seal 20. As the flexible circuit board exits the seal 20 it serves as the flexible cable 30. This integrated construction facilitates installation, alignment and adjustment of the outer bearing ring 22 within the housing 26 or 28 without damage to the various components. The flexible circuit board may be put in a sleeve or can be over-molded with a protective rubber jacket to provide further protection.

The seal 20 may comprise a metal reinforcement portion 52 in the form of a ring with an overmolded elastomeric seal lip 54 engaging the inner ring 16. The reinforcement portion 52 has a window cut out, as illustrated in FIG. 3, allowing the flexible cable 30 to pass through the seal 20 to the inner portion of the bearing, i.e., between the bearing seals. The reinforcement portion 52 may have an outer diameter portion 54 curled as shown to mount within a groove 56 of the outer ring by a snap-in or pop-in engagement as common on bearing seals or by other known retention means.

As illustrated in FIG. 3, a polymer cap 58 may be molded over the seal window of the reinforcement portion 52 to provide strain relief for the flexible cable 30 and to direct the flexible cable 30 radially outwardly and then axially outwardly. The cable 30 then bends radially outwardly as it passes within the snout portion 34, as illustrated in FIG. 2, to the protective box 32. The molded polymer cap 58 also surrounds the sensor 18 and stabilizes the sensor 18 for precise location relative to the sensor target 14. The sensor target 14 may be a magnetic ring fixed to a steel reinforcement ring 60, for example, that is mounted on the inner ring 16, as illustrated.

Although the inner ring 16 and the outer ring 22 may be separated by balls 62 within a retainer 64, as shown, other types of bearings may be used with the present invention. Alternatively, inner ring 16 and outer ring 22 may be separated by rollers or other rolling elements or by a sleeve or may provide integral sliding surfaces forming a plain bearing, for example.

The protective box 32 serves as a junction box joining the flexible cable 30 to a rugged transmission cable 66 and as a mounting for the rugged transmission cable 66, preferably with a strain relief 68. It should be understood that if the integrated construction described above is used, the circuit board 46 may be formed on a flexible circuit board and may be packaged inside the seal, integral with the sensor 18. In that event, the protective box 32 could be reduced in size but would still remain as a housing-mounted junction joining the flexible cable 30 and the rugged transmission cable 66.

Having described the invention, what is claimed is:

1. A housed, self-aligning bearing comprising:
    a housing having a bore along an axis;
    an inner ring and an outer ring rotatable with respect to the inner ring, the outer ring having a spherically convex outer surface mounted within the bore of the housing such that the outer ring may be misaligned with respect to the axis of the bore;
    a sensor target mounted on the inner ring;
    a seal mounted on the outer ring;
    a sensor mounted on the seal and in proximity to the target; and
    at least one flexible electrical conductor electrically connected to the sensor for transmitting signals from the sensor, a portion of the flexible electrical conductor being fixed to the housing.

2. The housed, self-aligning bearing according to claim 1, wherein the flexible conductor is provided by a flexible circuit board.

3. The housed, self-aligning bearing according to claim 2, wherein the flexible circuit board conductor includes electrical circuitry.

4. The housed, self-aligning bearing according to claim 1, further comprising a protective box fixed to the housing and providing protection for the flexible conductor and fixing of the flexible conductor with respect to the housing.

5. The housed, self-aligning bearing according to claim 4, wherein the protective box includes circuitry electrically connected to the flexible conductor.

6. The housed, self-aligning bearing according to claim 4, further comprising a transmission cable electrically connected to the flexible conductor.

7. The housed, self-aligning bearing according to claim 5, further comprising a transmission cable electrically connected to the circuitry.

8. The housed, self-aligning bearing according to claim 4, wherein the protective box includes a snout portion extending radially over the outer ring such that the snout portion provides some protection for the flexible conductor.

9. The housed, self-aligning bearing according to claim 1, wherein the seal includes a metal reinforcement portion mounted on the outer ring, the metal reinforcement portion providing an opening through which the flexible electrical conductor passes, and wherein the seal also includes an elastomeric portion overlying the metal reinforcement portion, providing a seal lip engaging the inner ring.

10. The housed, self-aligning bearing according to claim 9, further comprising a polymer cap molded over the opening in the metal reinforcement portion and at least a portion of the sensor such that the polymer cap stabilizes the sensor.

11. The housed, self-aligning bearing according to claim 1, wherein the sensor includes at least one Hall-effect device.

12. The housed, self-aligning bearing according to claim 1, wherein the housing is a pillow block type bearing housing with a central bight portion providing the bore and with two mounting portions extending outwardly from the central bight portion for mounting the housing such that the bore is aligned parallel to a support surface.

13. The housed, self-aligning bearing according to claim 1, wherein the housing is a flange type bearing housing with a central portion providing the bore and with at least two mounting portions extending outwardly from the central portion for mounting the housing such that the bore aligned perpendicular to a support surface.

14. The housed, self-aligning bearing according to claim 1, wherein the sensor target comprises a magnetic ring fixed to a metal reinforcement ring that is mounted on the inner ring.

15. The housed, self-aligning bearing according to claim 1, further comprising rolling elements positioned between the inner ring and the outer ring.

* * * * *